United States Patent [19]

Takahama et al.

[11] Patent Number: 5,264,404

[45] Date of Patent: Nov. 23, 1993

[54] METHOD OF FABRICATING A POROUS CLAY COMPOSITE INCLUDING INORGANIC PARTICLES WITH METAL PARTICLES DEPOSITED THEREON

[75] Inventors: Koichi Takahama; Masaru Yokoyama; Toshiharu Sako, all of Osaka, Japan

[73] Assignee: Matsushita Electric Works, Ltd., Osaka, Japan

[21] Appl. No.: 970,133

[22] Filed: Nov. 2, 1992

[30] Foreign Application Priority Data

Nov. 6, 1991 [JP] Japan .................. 3-290243

[51] Int. Cl.$^5$ .............................. B01J 37/34
[52] U.S. Cl. .............................. 502/5; 502/84
[58] Field of Search ....................... 502/5, 84

[56] References Cited

U.S. PATENT DOCUMENTS

| | | | |
|---|---|---|---|
| 4,127,506 | 11/1978 | Gray et al. | 502/5 |
| 4,629,713 | 12/1986 | Suzuki et al. | 502/84 |
| 4,665,045 | 5/1987 | Pinnavaia et al. | 502/84 |
| 5,149,513 | 9/1992 | Takahama et al. | 502/84 |

FOREIGN PATENT DOCUMENTS 3166435  7/1988  Japan .................. 502/5

OTHER PUBLICATIONS

Journal of Materials Science (Publisher; Chapman and Hall), No. 27 (1992), pp. 1297-1301, "Supercritical Drying of SiO2-TiO2 Sol-Pillared Clays", Published on Mar. 12, 1992.

*Primary Examiner*—Carl F. Dees
*Attorney, Agent, or Firm*—Armstrong, Westerman, Hattori, McLeland & Naughton

[57] ABSTRACT

A porous clay composite having fine metal particles deposited substantially only on surfaces of inorganic particles which are intercalated between layers of an expandable clay is obtained. After the expandable clay is expanded with a solvent into an expanded clay, the inorganic particles are intercalated between the layers of the expanded clay. The inorganic particles have photo-semiconducting property, that is, a plurality of carriers such as electrons and holes are released from the inorganic particles by irradiation of a light such as ultraviolet light. A solution including metal ions is mixed with the inorganic particles intercalated clay to form a mixed solution thereof. Subsequently, the light is irradiated to the mixed solution to deposit the fine metal particles substantially only on the inorganic particles which are intercalated between the layers of the expanded clay, so that the porous clay composite is formed in the mixed solution. The porous clay composite including the mixed solution is dried by a supercritical drying or a carbon dioxide extractive drying, etc., so as not to disrupt a porous structure thereof. When a metal having oxidation/reduction catalysis is used as the fine metal particles, the porous clay composite functions as an excellent oxidation/reduction catalyst.

13 Claims, 3 Drawing Sheets

METHOD OF FABRICATING A POROUS CLAY COMPOSITE INCLUDING INORGANIC PARTICLES WITH METAL PARTICLES DEPOSITED THEREON

BACKGROUND OF THE INVENTION

1. Field of the invention

The present invention is directed to a method of fabricating a porous clay composite including inorganic particles with fine metal particles deposited thereon which comprises depositing the metal particles, by irradiation of a light such as ultraviolet light, substantially only on the inorganic particles having photo semiconducting property which are intercalated between layers of an expandable clay.

2. Description of the Prior Art

It is known that inorganic compound particles are intercalated between layers of an expandable clay by an ion-exchange procedure as described in Journal of materials Science 27 (1992) 1297-1301. That is, the expandable clay such as Na-montmorillonite is expanded with a solvent, for example, water, for obtaining an expanded clay. The clay also has a number of hydrated exchangeable cations located between the layers. On the other hand, a sol solution including the inorganic compound particles is prepared, and then mixed with the expanded clay. Since the exchangeable cations in the clay are substituted with the inorganic compound particles having positive charges in the mixed sol solution, the inorganic compound particles are intercalated between the layers of the clay. After the intercalating, the mixed sol solution is dried by a supercritical drying, so that an inorganic compound particles-intercalated clay is obtained without disrupting a porous structure thereof. By the way, it is considered for obtaining an excellent oxidation/reduction catalyst that fine metal particles having oxidation/reduction catalysis are uniformly dispersed in the inorganic compound particles-intercalated clay so as to have a large total surface area of the metal particles. In a past, an impregnation method and a precipitation method were performed to disperse the metal particles in the inorganic compound particles-intercalated clay. For example, in accordance with the impregnation method, the inorganic compound particles intercalated clay is crushed to form powders thereof. A solution including metal ions is added to the powders little by little, and then the solution including the metal ions and the powders is agitated, so that the fine metal particles are formed on the powders. However, the metal particles were formed on the inorganic compound particles intercalated between the layers, and also on the layers of the expanded clay according to the impregnation method. The metal particles formed on the layers of the expanded clay can not function as the oxidation/reduction catalyst. Moreover, as the metal particles having a relatively large size are formed on the inorganic compound particles, it is not easy to obtain the large total surface area of the metal particles. Therefore, oxidation/reduction catalysis of the obtained metal particles will not be enough. Similarly, there are the same problems with respect to metal particles formed in accordance with the precipitation method.

SUMMARY OF THE INVENTION

The present invention relates to a method of fabricating a porous clay composite including inorganic particles with fine metal particles deposited thereon which comprises depositing the metal particles, by irradiation of a light such as ultraviolet light, substantially only on the inorganic particles having photosemiconducting property which are intercalated between layers of an expandable clay. That is, the expandable clay is expanded with a first solvent to obtain an expanded clay. The expanded clay is reacted with a sol solution including the inorganic particles, so that the inorganic particles are intercalated between the layers of the expanded clay. A metal having oxidation/reduction catalysis is added in the form of metal ions into the sol solution including the inorganic particles-intercalated clay, and then the light is irradiated to the sol solution including the metal ions and the intercalated clay. Since the inorganic particles have photo-semiconducting property, that is, a plurality of carriers such as electrons and holes are easily released from a filled band to a conduction band of the inorganic particles by radiating the light, the released carriers from the inorganic particles are supplied to the metal ions of the sol solution, so that the fine metal particles are deposited substantially only on the inorganic particles. The light irradiated sol solution is then dried. Therefore, according to the method of fabricating the porous clay composite of the present invention, the metal particles having an extremely fine size are efficiently formed substantially only on surfaces of the inorganic particles intercalated between the layers of the expandable clay, so that the obtained porous clay composite shows excellent oxidation/reduction catalysis.

It is, therefore, a primary object of the present invention to provide a method of fabricating a porous clay composite including inorganic particles with fine metal particles deposited thereon which comprises depositing fine metal particles, by irradiation of a light such as ultraviolet light, substantially only on inorganic particles having photo-semiconducting property which are intercalated between layers of an expandable clay.

In the method of fabricating the porous clay composite of the present invention, the expandable clay includes at least one selected from phyllosilicate minerals such as a Na-montmorillonite, Ca-montmorillonite, synthetic smectites, synthetic saponite, Na-taeniolite, Li-taeniolite, Na-hectorite, Li-hectorite, acid clay and synthetic mica, etc. The inorganic particles having photo-semiconducting property comprise at least one compound selected from the group consisting of titania, zirconia, tin oxide, lead oxide, zinc oxide, cadmium sulfide, cadmium selenide, tungsten oxide and strontium titanate. The metal particles having oxidation/reduction catalysis comprise at least one selected from the group consisting of platinum, gold, palladium, ruthenium, rhodium, copper, nickel, manganese and cobalt, etc. When the first solvent having a high reactivity with the carriers is used for expanding the expandable clay, the first solvent is replaced with a second solvent having a lower reactivity with the carriers than the first solvent before irradiation of the light. The first solvent comprises water. On the other hand, the second solvent is selected from acetone, toluene and benzene.

Before the light is radiated to the sol solution including the intercalated clay and the metal ions, a sacrificial reducing agent is added in the sol solution. As the reducing agent is capable of preventing a recombination of electrons with holes, the carriers are stably supplied from the inorganic particles to the metal ions, so that a deposition of the fine metal particles is enhanced. The reducing agent includes at least one selected from ethanol, methanol, acetic acid, acetic anhydride and oxalic acid.

It is another object of the present invention to provide a method of fabricating a porous clay composite including inorganic particles with fine metal particles deposited thereon which comprises using a sacrificial reducing agent capable of preventing a recombination of electrons with holes when the metal particles are deposited substantially only on the inorganic particles which are intercalated between layers of an expandable clay.

The light irradiated sol solution is dried by a supercritical drying or a liquid carbon dioxide extractive drying so as not to disrupt a porous structure of the porous clay composite. As the dried the porous clay composite of the present invention has an extremely large total surface area of the metal particles, the porous clay composite functions as an excellent oxidation/reduction catalyst.

It is a further object of the present invention to provide a method of fabricating a porous clay composite including inorganic particles with fine metal particles deposited thereon which comprises performing a supercritical drying or a liquid carbon dioxide extractive drying after the metal particles have been deposited substantially only on the inorganic particles which are intercalated between layers of an expandable clay.

The method of fabricating a porous clay composite including inorganic particles with fine metal particles deposited thereon of the present invention will be detailed hereinafter.

DETAILED DESCRIPTION OF THE INVENTION

Figure 1:
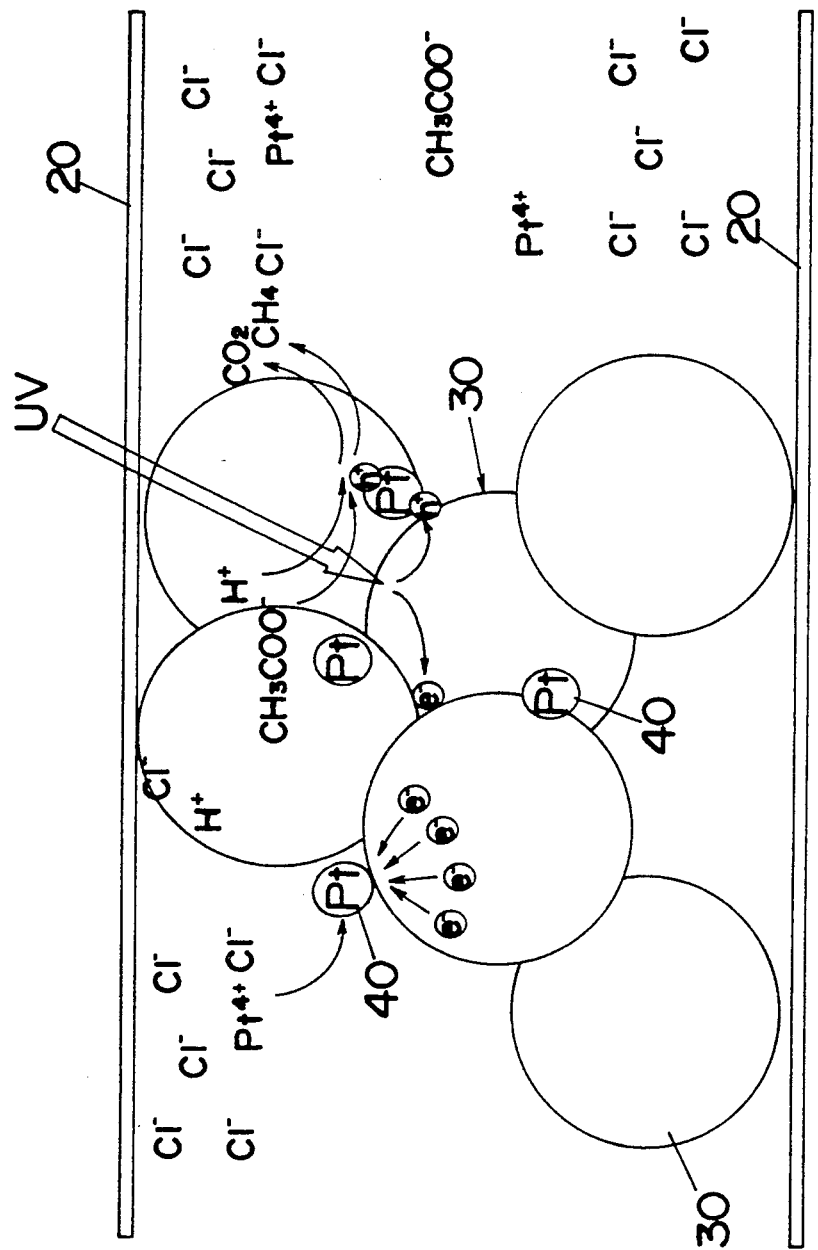
FIG. 1 illustrates a deposition mechanism of fine platinum particles on titania particles intercalated between layers of an expandable clay by radiating ultraviolet in accordance with the present invention.
Figure 2:
FIG. 2 shows a microstructure of an expandable clay dried by a supercritical drying.
Figure 3:
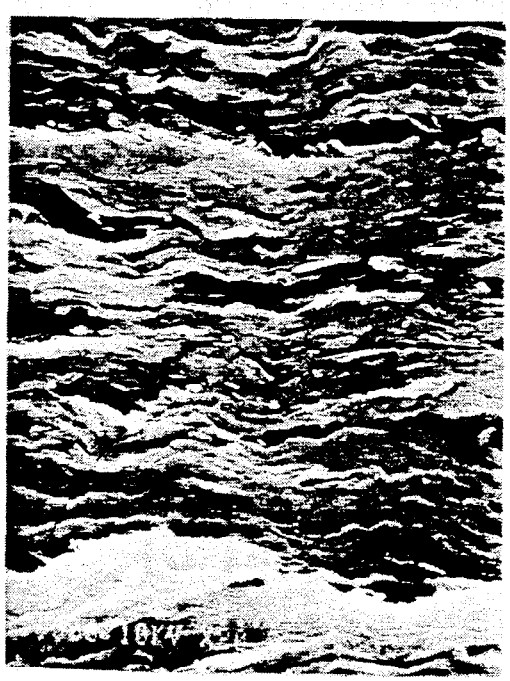
FIG. 3 shows a microstructure of an expandable clay dried by a heat-air drying.

An expandable clay used in the present invention includes at least one selected from phyllosilicate minerals such as a Na-montmorillonite, Ca-montmorillonite, synthetic smectites, synthetic saponite, Na-taeniolite, Li-taeniolite, Na-hectorite, Li-hectorite, acid clay and synthetic mica, etc. The expandable clay is composed of a plurality of clay particles three-dimensionally distributed so as to have a porous structure. Each of the clay particles consists of a number of stacked layers. A distance between the adjacent layers is about 2Å to 3Å. For example, Na-montmorillonite is composed of a plurality of clay particles, each of which consists of stacked two-dimensional aluminosilicate layers. Na-montmorillonite also has sodium ions between the aluminosilicate layers. The expandable clay is expanded with a first solvent for obtaining an expanded clay. A distance between the adjacent layers of the expanded clay is more than about 150Å. The first solvent comprises water. When it is difficult to expand the expandable clay such as Ca-montmorillonite and the acid clay, etc., with the first solvent, it is preferred that the clay and the first solvent are mulled by applying a strong shearing stress into the clay. On the other hand, a metal alkoxide is used as a starting material to obtain inorganic particles. The inorganic particles have photo-semiconducting property, that is, a plurality of carriers such as electrons and holes are released from a filled band to a conduction band of the inorganic particles by radiating a light such as ultraviolet light to the inorganic particles. The metal alkoxide is diluted by an alcohol. And then, hydrochloric acid is added as a catalyst in the diluted metal alkoxide in order to form a sol solution including the inorganic particles. The inorganic particles used in the present invention include at least one compound selected from the group consisting of titania, zirconia, tin oxide, lead oxide, zinc oxide, cadmium sulfide, cadmium selenide, tungsten oxide, strontium titanate, etc. In place of hydrochloric acid, there may be added to the diluted metal alkoxide, nitric acid, ammonia, piperidine and a sodium hydroxide aqueous solution. The sol solution is reacted with the expanded clay so as to occur an intercalation reaction which comprises intercalating the inorganic particles between the layers of the expanded clay. For example, when the expanded clay is a water expanded Na-montmorillonite, the sodium ions of the expanded Na-montmorillonite are substituted with the inorganic particles during the intercalation reaction. The intercalation reaction is performed under an optimum condition, for example, at a temperature of 60° C. for 1.5 hours. As the inorganic particles having a small and uniform size are formed from the metal alkoxide, it is so easy to intercalate the inorganic particles between the layers of the expanded clay, so that an inorganic particles-intercalated clay, which has a large total surface area of the inorganic particles, is formed in the sol solution. A metal having oxidation/reduction catalysis is added in the form of metal ions into the sol solution including the intercalated clay. The metal includes at least one selected from the group consisting of platinum, palladium, ruthenium, rhodium, copper, nickel, manganese, cobalt, etc. Subsequently, a light such as ultraviolet light is irradiated to the sol solution including the metal ions and the intercalated clay, so that fine metal particles are deposited substantially only on the inorganic particles in the intercalated clay. The first solvent included in the sol solution is replaced with a second solvent having a lower reactivity with the carriers than the first solvent as necessary before irradiation of the light. When the light is irradiated to the sol solution which includes the first solvent having a high reactivity with the carriers, the deposition of the fine metal particles is prevented because the carriers supplied from the inorganic particles are decreased by reacting with the first solvent. The second solvent is selected from acetone, toluene and benzene, etc. For example, a deposition mechanism of fine platinum particles 40 on titania particles 30 intercalated between the layers 20 of the expanded clay by irradiation of ultraviolet(Uv) is illustrated in FIG. 1. In this illustration, platinum chloride acid hexahydrate is used to obtain platinum ions. Ultraviolet light is irradiated to a titania sol solution including the platinum ions and a titania particles-intercalated clay. As the carriers, for example, electrons, are easily released from the filled band to the conduction band of the titania particles by irradiation of ultraviolet light, the released electrons are supplied to the platinum ions ($Pt^{4+}$) at surfaces of the titania particles, so that fine platinum particles 40 are efficiently deposited substantially only on the surfaces of the titania particles 30. By the way, before the light is radiated to the sol solution including the intercalated clay and the metal ions, it is preferred that a sacrificial reducing agent is added in the sol solution, because the agent is capable of preventing a recombination of electrons($e^-$) with holes($h^+$). Therefore, the released electrons are stably supplied to the metal ions in the sol solution so as to enhance the deposition of the fine metal particles. The reducing agent includes at least one selected from the group consisting of ethanol, methanol, acetic acid, acetic anhydride and oxalic acid. In FIG. 1, acetic acid of the sacrificial reducing agent is added to the titania sol solution. As acetic ions($CH_3COO^-$) easily react with holes ($h^+$), the electrons released from the titania particles are efficiently supplied to the platinum ions ($Pt^{4+}$) without occurring the recombination with holes. It is known that only cations can be intercalated between the layers of the expandable clay. For example, as the platinum makes a complex to behave as anions, the platinum can not be usually intercalated between the layers of the clay. However, in the present invention, the platinum particles can be deposited on the inorganic particles intercalated between the layers of the expanded clay in accordance with a reduction reaction of electrons supplied from the inorganic particles by radiating the light. Since the inorganic particles are also intercalated between the layers so as to have the large total surface area thereof, the fine metal particles deposited on the inorganic particles have an extremely large total surface area of the metal particles. Therefore, according to a method of fabricating a porous clay composite of the present invention, the metal particles having an extremely fine size are efficiently deposited substantially only on the surfaces of the inorganic particles which are intercalated between the layers of the expanded clay. After the deposition of the metal particles, a centrifugation separation of a liquid phase included in the light irradiated sol solution is performed, so that a gel including the porous clay composite is obtained. The gel is molded to a desired shape, for example, a plate or a stick as necessary. Continuously, the gel is dried by a supercritical drying. A remaining liquid phase in the gel is perfectly removed by the supercritical drying without disrupting a porous structure of the expanded clay, as shown in FIG. 2. Therefore, since the dried porous clay composite maintains the extremely large total surface area of the metal particles, the porous clay composite is used as an excellent oxidation/reduction catalyst. The oxidation/reduction catalyst of the present invention functions as an oxidation catalyst in case of using in an oxygen rich environment. For example, when the oxidation/reduction catalyst is used in a carbon monoxide rich environment, carbon monoxide is oxidized to carbon dioxide by the catalyst. And also, the oxidation/reduction catalyst functions as a reduction catalyst in case of using in a hydrogen or hydrocarbon rich environment. On the other hand, when a heat-air drying is utilized to dry the gel, the porous structure of the expanded clay is often disrupted by a strong surface tension occurring between the layers at the time of evaporating the remaining liquid phase, as shown in FIG. 3. However, it is not concerned with respect to the present invention that the heat-air drying, a heat drying or a freeze drying, etc., is adopted to dry the gel. By the way, when the remaining liquid phase in the gel has a high critical point, it is preferred that the remaining liquid phase is replaced with a third solvent having a low critical point. For obtaining a supercritical condition in a practical use, the third solvent having the low critical point is selected from ethanol, methanol, carbon dioxide, dichlorodifluoromethane and ethylene, etc. A critical temperature and pressure of each third solvent are shown in TABLE 1.

TABLE 1

| A critical temperature and pressure of a third solvent. | | |
|---|---|---|
| Third Solvent | Critical Temperature (°C.) | Critical Pressure (atm) |
| Water ($H_2O$) | 374.2 | 217.6 |
| Methanol | 240.0 | 78.7 |
| Ethanol | 243.1 | 63.1 |
| Carbon dioxide | 31.1 | 72.8 |
| Dichlorodifluoromethane | 111.9 | 40.7 |

Figure 4:
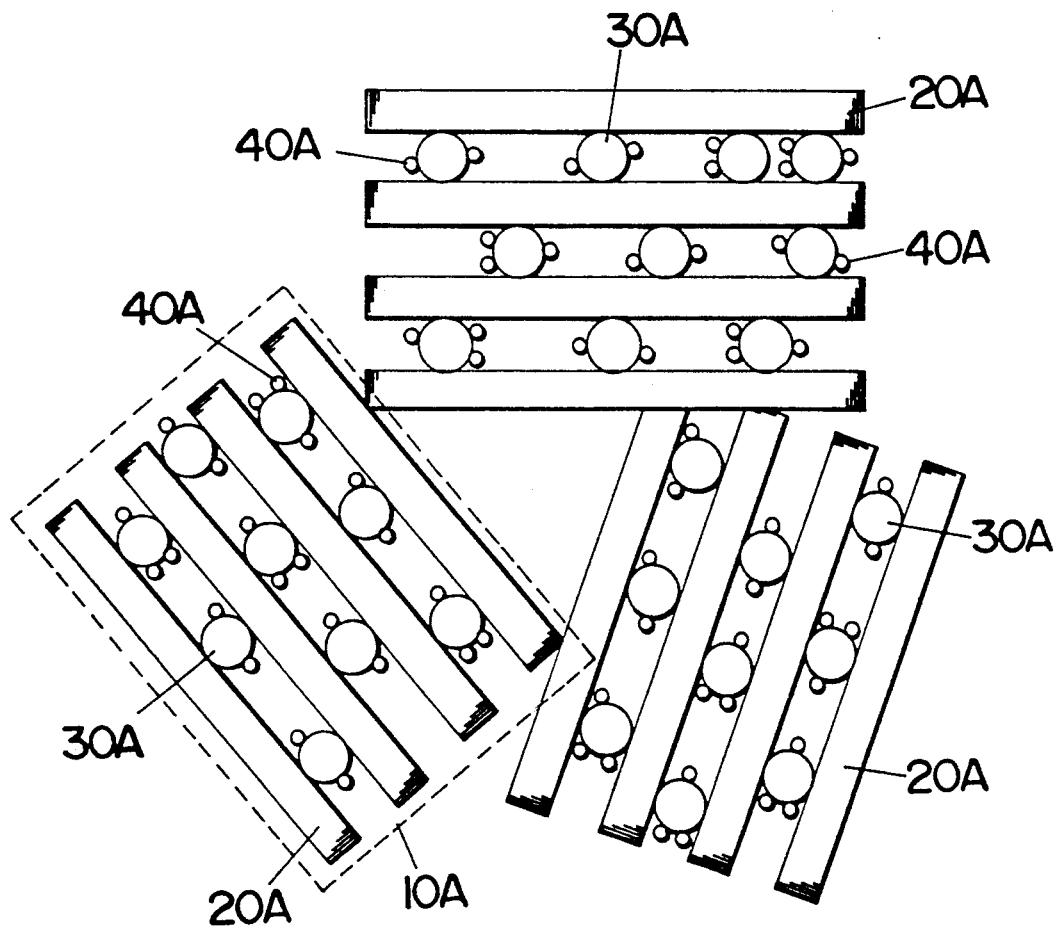
FIG. 4 illustrates a schematic structure of a porous clay composite formed in accordance with the present invention.

For example, in case that water is included in the gel, since water has a high critical point which is 374.2° C. of the critical temperature and 217.6 atm of the critical pressure, a special autoclave needs to perform the supercritical drying. Therefore, for example, the water included in the gel is replaced with ethanol having a lower critical point compared with water. And also, carbon dioxide held in the supercritical condition is added to the ethanol included in the gel little by little, and finally all of the ethanol included in the gel is replaced with the carbon dioxide in the supercritical condition, so that the gel is easily dried by the supercritical drying. On the other hand, it is also preferred that the gel is dried by a liquid carbon dioxide extractive drying. Liquid carbon dioxide is easily obtained at a temperature higher than −60° C. under a pressure more than about 10 atm. As liquid carbon dioxide is capable of extracting the remaining liquid phase from the gel under a more mild condition compared with the supercritical drying, the gel is easily dried while maintaining the porous structure of the expanded clay. A schematic structure of the dried porous clay composite particle 10A is shown in FIG. 4. The fine metal particles 40A ar formed substantially only on the inorganic particles 30A which are intercalated between the layers 20A of the expandable clay. The porous clay composite is composed of 10 to 150 parts of the inorganic particles and 0.1 to 5.0 parts of the metal particles in 100 parts by weight of the expandable clay. Further details of the present invention are described in the following Examples 1 to 10. However, the Examples are illustrative of the invention, and are not to be construed as to limiting the scope thereof in any manner.

EXAMPLE 1

Platinum chloride acid hexahydrate ($H_2PtCl_6.6H_2O$: a chemical reagent manufactured by Nakalai Tesque Co., LTD.) was dissolved in water to obtain a platinum chloride acid hexahydrate aqueous solution. Titanium tetraisopropoxide ($Ti(OC_3H_7)_4$: a chemical reagent manufactured by Nakalai Tesque Co., LTD.) was added to a 2M-hydrochloric acid aqueous solution, so that a transparent titania sol solution was obtained. Titania has photo-semiconducting property, that is, a plurality of carriers such as electrons or holes are released from a filled band to a conduction band of titania by radiating ultraviolet light to titania. On the other hand, Na-montmorillonite of KUNIPIA-F (trade name of the Na-montmorillonite manufactured by Kunimine Industry Co., LTD.) was dispersed in water to form a water expanded Na-montmorillonite which includes 0.8 wt % Na-montmorillonite. Na-montmorillonite is composed of a plurality of clay particles, each of which consists of stacked two-dimensional aluminosilicate layers. The titania sol solution was reacted with the expanded Na-montmorillonite so as to occur a titania intercalation reaction, so that titania particles in the titania sol solution were intercalated between the adjacent aluminosilicate layers of the expanded Na-montmorillonite. The titania intercalation reaction was performed at a temperature of 60° C. for 1.5 hours. A titania particles-intercalated Na-montmorillonite was separated from the reacted sol solution by a centrifugal separation, and then a water cleaning of the intercalated Na-montmorillonite was performed to replace the remaining solution included in the intercalated Na-montmorillonite with water. The centrifugal separation and water cleaning were repeated several times. Subsequently, the platinum chloride acid hexahydrate aqueous solution and acetic anhydride as a sacrificial reducing agent were mixed with the intercalated Na-montmorillonite including water. Ultraviolet light was then irradiated to the mixed solution for 3 hours, so that a porous clay composite having fine platinum particles deposited on the titania particles which were intercalated between the aluminosilicate layers of the expanded Na-montmorillonite, was formed in the mixed solution. Ultraviolet light was supplied from a high-pressure mercury-vapor lamp (550 W). The porous clay composite was separate mixed solution by the centrifugal separation, and then an ethanol cleaning of the porous clay composite was performed. After the centrifugal separation and ethanol cleaning were repeated several times, the porous clay composite including ethanol was dried at a temperature of 40° C. under a pressure of 80 atm for about 8 hours by a supercritical drying while adding therein carbon dioxide little by little. Therefore, the porous clay composite was dried so as not to disrupt a porous structure thereof. Consequently, the porous clay composite of Example 1 was obtained in accordance with the above method of the present invention. The porous clay composite of Example 1 was formed such that a ratio of Na-montmorillonite:titania particles:platinum particles is 1:0.6:0.03 by weight.

EXAMPLE 2

A porous clay composite of Example 2 having fine platinum particles formed on titania particles which are intercalated between the adjacent aluminosilicate layers of Na-montmorillonite, was obtained in accordance with the same method of Example 1 except that ethanol was used instead of acetic anhydride.

EXAMPLE 3

A porous clay composite of Example 3 having fine platinum particles formed on tin oxide particles which are intercalated between the adjacent aluminosilicate layers of Na-montmorillonite, was obtained in accordance with the same method of Example 1 except that a tin oxide sol (a chemical reagent manufactured by Nissan Chemical Industry Co., LTD.) was used instead of titanium tetraisopropoxide.

EXAMPLE 4

A porous clay composite of Example 4 having fine platinum particles formed on titania particles which are intercalated between the adjacent aluminosilicate layers of synthetic saponite, was obtained in accordance with the same method of Example 1 except that synthetic saponite of SMECTON-SA (trade name of synthetic saponite manufactured by kunimine Industry Co., LTD.) was used instead of Na-montmorillonite.

EXMAPLE 5

A porous clay composite of Example 5 having fine palladium particles formed on titania particles which are intercalated between the adjacent aluminosilicate layers of Na-montmorillonite, was obtained in accordance with the same method of Example 1 except that palladium chloride (a chemical reagent manufactured by Nakalai Tesque Co., LTD.) was used instead of platinum chloride acid hexahydrate.

EXAMPLE 6

A 2M-hydrochloric acid aqueous solution and ethanol were added to titanium tetraisopropoxide of a metal alkoxide (a chemical reagent manufactured by Nakalai Tesque Co., Ltd.), so that a transparent titania sol solution was obtained. On the other hand, Na-montmorillonite of Kunipia-F (trade name of Na-montmorillonite manufactured by Kunimine Industry Co., LTD.) was dispersed in water to obtain a water expanded Na-montmorillonite which includes 0.8 wt % Na-montmorillonite. The titania sol solution was reacted with the expanded Na-montmorillonite so as to occur the titania intercalation reaction, so that titania particles in the titania sol solution were intercalated between the adjacent aluminosilicate layers of the expanded Na-montmorillonite. The titania intercalation reaction was performed at a temperature of 60° C. for 1.5 hours. A titania particles-intercalated Na-montmorillonite was formed such that a ratio of Na-montmorillonite:titania particles is 1:0.6 by weight. The intercalated Na-montmorillonite was separated from the reacted sol solution by the centrifugal separation, and then an acetone cleaning of the intercalated Na-montmorillonite was performed to replacing the remaining solution included in the intercalated Na-montmorillonite with acetone. The centrifugal separation and acetone cleaning were repeated several times. Subsequently, the intercalated Na-montmorillonite was mixed with acetic anhydride as the sacrificial reducing agent and platinum chloride acid hexahydrate dissolved in acetone. An amount of platinum chloride acid hexahydrate was determined such that a weight ratio of Na-montmorillonite : platinum chloride acid hexahydrate is 1:0.025. An amount of acetic anhydride was about 10% by weight of a total amount of liquid phase included in the mixed solution. Ultraviolet light is then irradiated to the mixed solution for 3 hours, so that a porous clay composite having fine platinum particles deposited on the titania particles which were intercalated between the aluminosilicate layers of the expanded Na-montmorillonite, was formed in the mixed solution. Ultravioloet light was supplied from a high-pressure mercury-vapor lamp (550 W). The porous clay composite was separated from the mixed solution by the centrifugal separation, and then the ethanol cleaning of the porous clay composite was performed. After the centrifugal separation and ethanol cleaning were repeated several times, the porous clay composite including ethanol was dried at the temperature of 40° C. under the pressure of 80 atm for about 8 hours by the supercritical drying while adding therein carbon dioxide little by little. The dried porous clay composite was sintered at a temperature of 400° C. in order to improve adhesions between the titania particles and the fine platinum particles, and between the titania particles and the aluminosilicate layers. Consequently, the porous clay composite of Example 6 was obtained in accordance with the above method of the present invention.

EXAMPLE 7

A porous clay composite of Example 7 having fine platinum particles formed on titania particles which are intercalated between the adjacent aluminosilicate layers of Na-montmorillonite, was obtained in accordance with the same method of Example 6 except that a heat-air drying was performed at 80° C. for 5 hours instead of the supercritical drying.

EXAMPLE 8

A porous clay composite of Example 8 having fine platinum particles formed on tin oxide particles which are intercalated between the adjacent aluminosilicate layers of Na-montmorillonite, was obtained in accordance with the same method of Example 6 except that a tin oxide sol (a chemical reagent manufactured by Nissan Chemical Industry Co., LTD.) was used instead of titanium tetraisopropoxide.

EXAMPLE 9

A porous clay composite of Example 9 having fine platinum particles formed on titania particles which are intercalated between the adjacent aluminosilicate layers of Na-montmorillonite, was obtained in accordance with the same method of Example 6 except that toluene was used instead of acetone of the mixed solution.

EXAMPLE 10

A porous clay composite of Example 10 having fine platinum particles formed on titania particles which are intercalated between the adjacent aluminosilicate layers of Na-montmorillonite, was obtained in accordance with the same method of Example 6 except that a liquid carbon dioxide extractive drying was performed at 5° C. under 60 atm instead of the supercritical drying.

COMPARATIVE EXAMPLE

Titanium tetraisopropoxide ($Ti(OC_3H_7)_4$: a chemical reagent manufactured by Nakalai Tesque Co., Ltd) was added to a 2M-hydrochloric acid aqueous solution, so that a transparent titania sol solution was obtained. On the other hand, Na-montmorillonite of Kunipia-F (trade name of the Na-montmorillonite manufactured by Kunimine Industry Co., LTD.) was dispersed in water to obtain a water expanded Na-montmorillonite which includes 0.8 wt % Na-montmorillonite. The titania sol solution was reacted with the expanded Na-montmorillonite so as to occur the titania intercalation reaction, so that titania particles in the titania sol were intercalated between the adjacent aluminosilicate layers of the expanded Na-montmorillonite. The titania intercalation reaction was performed at a temperature of 60° C. for 1.5 hours. A titania particles-intercalated Na-montmorillonite was separated from the reacted sol solution by the centrifugal separation, and then the water cleaning of the intercalated Na-montmorillonite was performed. The centrifugal separation and water cleaning were repeated several times. The centrifugal separation and the ethanol cleaning of the intercalated Na-montmorillonite were repeated several times to replace the water included in the intercalated N-montmorillonite with ethanol. Subsequently, the intercalated Na-montmorillonite including ethanol was dried at 40° C. under adding thereto carbon dioxide little by little. The dried Na-montmorillonite including the titania particles was sintered at 400° C. to improve adhesion between the titania particles and the aluminosilicate layers of Na-montmorillonite. Fine platinum particles were formed on the sintered Na-montmorillonite including the titania particles in accordance with an impregnation method of the prior art. That is to say, the sintered Na-montmorillonite was crushed to obtain powders thereof, and then the powders were classified under 100 mesh. The platinum chloride acid hexahydrate aqueous solution was dropped into the classified powders while stirring, so that a porous clay composite having the platinum particles formed on the titania particles intercalated between the aluminosilicate layer, and also on the aluminosilicate layers of Na-montmorillonite, was obtained. The porous clay composite including the aqueous solution was dried at 60° C., and then hydrogen-reduced at 400° C.. Consequently, the porous clay composite of Comparative Example was obtained in accordance with the above method.

A specific surface, a specific pore volume and a carbon monoxide removing rate of a porous clay composite were measured with respect to Examples 1 to 10 and Comparative Example, as shown in TABLE 2. The porous clay composite of Examples 1 to 10 except for Example 7 have a much larger specific surface and specific pore volume than that of Comparative Example. The porous clay composite of Example 7 has a small specific surface and specific pore volume because the porous clay composite was dried by the heat-air drying, so that an optimum porous structure of the porous clay composite was not obtained. However, as described below, the porous clay composite of Example 7 shows an excellent carbon monoxide removing rate as compared with that of Comparative Example. The carbon monoxide removing rate was measured by the following method. That is, the porous clay composite was set in a vessel. An air having a concentration of carbon monoxide gas of 35 ppm was flowed through the vessel. A concentration of carbon monoxide gas included in an exhaust air from the vessel is detected at a room temperature by a gas chromatography. The carbon monoxide removing rate was measured twice, that is, immediately after starting to flow the air into the vessel, and also after flowing the air for 24 hours. As shown in TABLE 2, the porous clay composites of Examples 1 to 10 demonstrated the excellent carbon monoxide removing rate even after flowing the air into the vessel for 24 hours. The porous clay composite of Examples 1 and 6 perfectly removed carbon monoxide gas from the air immediately after starting to flow the air therein. However, after flowing the air therein for 24 hours, the porous clay composite of Example 6 maintains a higher carbon monoxide removing rate than that of Example 1. This result indicates that since acetone used in Example 6 has a lower reactivity with the carriers such as electrons and holes than water used in Example 1, the deposition of fine platinum particles of Example 6 is enhanced, so that the fine platinum particles are formed so as to have an extremely large total surface area of the platinum particles on the titania particles. On the other hand, the porous clay composite of Example 1 also has a much higher carbon monoxide removing rate than that of Comparative Example. Since the fine platinum particles of Example 1 are formed substantially only on the titania particles, the fine platinum particles show excellent oxidation/reduction catalysis. However, as the fine platinum particles of Comparative Example are formed on the titania particles intercalated between the aluminosilicate layers, and also on the aluminosilicate layers of Na-montmorillonite in accordance with the impregnation method, oxidation/reduction catalysis of the porous clay composite is not enough, because the fine platinum particles formed directly on the aluminosilicate layers can not perform oxidation/reduction catalysis.

TABLE 2

A specific surface, specific pore volume and carbon monoxide removing rate of a porous clay composite measured with respect to Examples 1 to 10 and Comparative Example.

|  | Specific Surface ($m^2/g$) | Specific Pore Volume (ml/g) | Carbon monoxide removing rate (%) | |
| --- | --- | --- | --- | --- |
|  |  |  | First measurement *1 | Second measurement *2 |
| Example 1 | 358 | 0.74 | 100 | 95 |
| Example 2 | 273 | 0.65 | 95 | 85 |
| Example 3 | 355 | 0.68 | 99 | 93 |
| Example 4 | 486 | 1.25 | 95 | 90 |
| Example 5 | 324 | 0.72 | 75 | 60 |
| Example 6 | 362 | 0.79 | 100 | 98 |
| Example 7 | 181 | 0.38 | 80 | 75 |
| Example 8 | 353 | 0.70 | 100 | 96 |
| Example 9 | 358 | 0.75 | 99 | 97 |
| Example 10 | 325 | 0.68 | 100 | 95 |
| Comparative Example | 181 | 0.25 | 50 | 24 |

*1 First measurement of the carbon monoxide removing rate was performed immediately after starting to flow an air including carbon monoxide gas to the porous clay composite.
*2 Second measurement of the carbon monoxide removing rate was performed after flowing the air including carbon monoxide gas to the porous clay composite for 24 hours.

What is claimed is:

1. A method of fabricating a porous clay composite including inorganic particles with metal particles deposited thereon, said method comprising the steps of:
   expanding an expandable clay with a solvent to prepare an expanded clay of multi-layer structure having a plurality of layers;
   adding said inorganic particles to said expanded clay to intercalate said inorganic particles between the layers of said expanded clay, said inorganic particles having photo-semiconducting property capable of developing electric carriers upon being irradiated by a light;
   mixing a metal solution containing metal ions with said clay to form a mixture solution thereof;
   radiating the light to said mixture solution to develop the electric carriers around the inorganic particles intercalated between the layers of said clay, thereby reacting said metal ions with the carriers to deposit resulting metal particles on the inorganic particles; and
   drying said mixture solution in order to remove liquid phase thereof to thereby obtain said porous clay composite.

2. A method as set forth in claim 1, wherein said solvent in the expanded clay is replaced with a second solvent having lower reactivity with said carriers than said solvent prior to irradiating the light to said mixture solution.

3. A method as set forth in claim 2, wherein said second solvent is selected from the group consisting of acetone, toluene and benzene.

4. A method as set forth in claim 1, wherein said expandable clay is at least one of phyllosilicate mineral selected from the group consisting of Na-montmorillonite, Ca-montmorillonite, synthetic smectites, synthetic saponite, Na-taeniolite, Li-taeniolite, Na-hectorite, Li-hectorite, acid clay and synthetic mica.

5. A method as set forth in claim 1, wherein said solvent comprises water.

6. A method as set forth in claim 1, wherein said inorganic particles comprise at least one compound selected from the group consisting of titania, zirconia, tin oxide, lead oxide, cadmium sulfide, cadmium selenide, tungsten oxide, and strontium titanate.

7. A method as set forth in claim 1, wherein said metal particles have oxidation and/or reduction catalysis.

8. A method as set forth in claim 7, wherein said metal particles comprise at least one member selected from the group consisting of platinum, gold, palladium, ruthenium, rhodium, copper, nickel, manganese and cobalt.

9. A method as set forth in claim 6, wherein said inorganic particles are mixed in the form of a sol solution to said expanded clay, said sol solution being prepared by mixing a metal alkoxide of said compound into an alcohol.

10. A method as set forth in claim 1, wherein a sacrificial reducing agent is added to said mixture solution prior to irradiation of the light thereto, said sacrificial reducing agent capable of preventing neutralization of said carrier before deposition of said metal particles.

11. A method as set forth in claim 1, wherein said mixture solution is dried by a supercritical drying.

12. A method as set forth in claim 1, wherein said mixture solution is dried by a liquid carbon dioxide extractive drying.

13. A method as set forth in claim 1, wherein said supercritical drying is effected after said solvent in said clay is replaced with a third solvent selected from the group consisting of ethanol and liquid carbon dioxide.

* * * * *